US009280856B2

(12) United States Patent
Chen et al.

(10) Patent No.: US 9,280,856 B2
(45) Date of Patent: Mar. 8, 2016

(54) METHOD AND APPARATUS FOR ESTIMATING REPLACEMENT OF VEHICLE ENGINE OIL

(75) Inventors: Kevin Chen, Canton, MI (US); Christopher Oberski, Plymouth, MI (US); Peter M. Lyon, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 450 days.

(21) Appl. No.: 13/302,142

(22) Filed: Nov. 22, 2011

(65) Prior Publication Data

US 2013/0131912 A1 May 23, 2013

(51) Int. Cl.
*G01M 15/05* (2006.01)
*G07C 5/00* (2006.01)
*G07C 5/08* (2006.01)
*F01M 11/10* (2006.01)

(52) U.S. Cl.
CPC .............. *G07C 5/006* (2013.01); *G07C 5/0825* (2013.01); *F01M 2011/14* (2013.01); *F01M 2011/1426* (2013.01); *F01M 2011/1486* (2013.01)

(58) Field of Classification Search
CPC .................... F01M 2011/14; F01M 2011/142; F01M 2011/1486
USPC ....................................... 701/29.5; 73/114.55
See application file for complete search history.

(56) References Cited

U.S. PATENT DOCUMENTS 4,506,337 A 3/1985 Yasuhara
4,677,847 A * 7/1987 Sawatari et al. ............. 73/53.05
4,706,193 A * 11/1987 Imajo et al. .................. 701/29.5
4,796,204 A * 1/1989 Inoue ......................... 123/196 S
5,060,156 A 10/1991 Vajgart et al.
5,382,942 A * 1/1995 Raffa et al. ................ 340/457.4
5,530,647 A * 6/1996 Sem et al. .................... 701/29.5
5,969,601 A * 10/1999 Sato et al. .................. 340/450.3
6,208,245 B1 * 3/2001 Post et al. .................. 340/457.4
6,253,601 B1 * 7/2001 Wang et al. ................ 73/114.55
6,266,587 B1 * 7/2001 Guertler et al. .............. 701/29.5
6,327,900 B1 * 12/2001 McDonald et al. ........ 73/114.55
6,513,368 B2 * 2/2003 Bondarowicz et al. ...... 73/53.05
6,580,366 B1 * 6/2003 Engfehr ..................... 340/457.4
6,732,572 B1 * 5/2004 Pickert et al. ................ 73/54.01
6,917,865 B2 * 7/2005 Arai et al. .................... 701/29.5

(Continued)

OTHER PUBLICATIONS

Gm—Environment—News—GM Oil Life System [online], 2010 [retrieved on Oct. 5, 2010]. Retrieved from the Internet< URL: http://www.gm.com/corporate/responsibility/environment/maintenance/simplified_maintenace_040104.jsp.

*Primary Examiner* — Thomas G Black
*Assistant Examiner* — Peter D Nolan
(74) *Attorney, Agent, or Firm* — Frank A. MacKenzie; MacMillan, Sobanski & Todd, LLC

(57) ABSTRACT

A method generates a useful life indication of a lubricating fluid in an engine. Initially, a quantity of use of an engine and a time of use of the engine are measured. A useful life indication of a lubricating fluid in the engine is generated based upon a first relationship between the quantity of use of an engine and the time of use of the engine when an operating characteristic is at or below a predetermined amount, such as the average speed of a vehicle containing the engine. The useful life indication of the lubricating fluid in the engine is generated based upon a second relationship between the quantity of use of an engine and the time of use of the engine when the operating characteristic is above the predetermined amount.

19 Claims, 4 Drawing Sheets

(56) References Cited

U.S. PATENT DOCUMENTS

| | | | | |
|---|---|---|---|---|
| 6,920,779 | B2 * | 7/2005 | Carlstrom et al. | 73/53.05 |
| 6,927,682 | B1 | 8/2005 | Touhey et al. | |
| 7,266,472 | B2 * | 9/2007 | Neumann et al. | 702/177 |
| 8,359,913 | B2 * | 1/2013 | Schneider et al. | 73/114.55 |
| 8,370,009 | B2 * | 2/2013 | Gremminger et al. | 701/21 |
| 8,392,054 | B2 * | 3/2013 | Schneider et al. | 701/29.5 |
| 8,482,420 | B2 * | 7/2013 | Blossfeld et al. | 340/603 |
| 2002/0029618 | A1 * | 3/2002 | Fukui | 73/53.01 |
| 2002/0129645 | A1 * | 9/2002 | Konno et al. | 73/118.1 |
| 2002/0133274 | A1 * | 9/2002 | Kubo et al. | 701/30 |
| 2004/0093150 | A1 * | 5/2004 | Arai et al. | 701/104 |
| 2004/0093931 | A1 * | 5/2004 | Carlstrom et al. | 73/53.05 |
| 2008/0228339 | A1 * | 9/2008 | Rains et al. | 701/29 |
| 2009/0145211 | A1 * | 6/2009 | Schneider | 73/114.55 |
| 2010/0174443 | A1 * | 7/2010 | Kubota et al. | 701/30 |
| 2011/0208385 | A1 * | 8/2011 | Johnson | 701/30 |

* cited by examiner

METHOD AND APPARATUS FOR ESTIMATING REPLACEMENT OF VEHICLE ENGINE OIL

BACKGROUND OF THE INVENTION

This invention relates in general to methods for evaluating the condition of a lubricating material, such as oil, in a vehicle engine. In particular, this invention relates to an improved method for estimating when such a lubricating material should be changed.

Virtually all types of engines (such as internal combustion, diesel, and the like) use one or more lubricating materials, such as oil, to provide lubrication between engaging mechanical components that slide or otherwise move relative to one another. The use of such lubricating materials reduces the amount of friction that occurs between these engaging and sliding components, thereby minimizing the generation of undesirable heat and wear. It is well known that the ability of most lubricating materials to perform this function degrades as a result of use. As a result, replacing old lubricating material with new lubricating material too infrequently can result in damage to the engine. However, it is also known that replacing the lubricating material too frequently is undesirably wasteful.

Many engine manufacturers simply recommend that the lubricating material in the engine be replaced at predetermined fixed intervals of either distance traveled by the vehicle or amount of time of usage of the engine. For example, some engine manufacturers recommend that the lubricating material in the engine be replaced after a fixed amount of distance of travel by the vehicle, such as 7,500 miles. In other instances, engine manufacturers recommend that the lubricating material in the engine be replaced after a fixed amount of time of engine operation, such as 200 hours for example. In both instances, it is known to generate an audible and/or visual alarm to alert an operator of a vehicle when either or both of these fixed intervals has been reached.

Although these fixed interval types of systems have functioned satisfactorily, the fixed intervals that are used therein merely represent estimates that are based upon predetermined assumptions of operation of the vehicle. Consequently, if the vehicle is operated differently from those predetermined assumptions, then the fixed interval types of systems can estimate replacement of the lubricating material at less than optimal occasions (both sooner and later) than is desirable in light of the actual operating conditions of the engine. For example, it is known that an engine experiences relatively harsh operating conditions when operated at relatively extreme speeds (such as when the vehicle is either idling or driven at racing speeds), while an engine experiences relatively mild operating conditions when operated at relatively moderate speeds (such as when the vehicle is driven at moderate speeds). Thus, if the vehicle is idling or driven at racing speeds for an extended period of time (more than that assumed by a fixed interval type of system), it would be desirable to replace the lubricating material sooner than the predetermined time interval of 200 hours of engine operation. Conversely, if the vehicle is driven at moderate speeds for an extended period of time (again, more than that assumed by a fixed interval type of system), it would be desirable to replace the lubricating material later than the predetermined distance interval of 7,500 miles.

Additionally, the assumed correlation between amount of distance of traveled by the vehicle and the condition of the lubricating material used in the engine is even more tenuous in the context of hybrid vehicles, which are becoming increasingly popular. In such hybrid vehicles, the actual amount of use of the engine can vary widely depending upon how the hybrid vehicle is operated. For example, when driven for relatively small distances and time durations, the hybrid vehicle may be propelled primarily or exclusively by a battery-driven motor. In those situations, the engine may not used much (or at all) in relation to the amount of distance of traveled by the vehicle. However, when driven for relatively large distances and time durations, the hybrid vehicle may not be propelled much (or at all) by the battery-driven motor. Thus, the engine may be used quite a bit in relation to the amount of distance of traveled by the vehicle.

To address some of the shortcomings of fixed interval types of systems, it is also known to replace the lubricating material when any one of a plurality of engine operating parameters is reached. Such engine operating parameters can include, for example, a predetermined amount of fuel in the oil or a predetermined amount of soot in the oil. Each of these engine operating parameters can be detected by a conventional sensor and fed to a controller. In response thereto, the controller can generate an audible and/or visual alarm to an operator of a vehicle when either one (or both) of these engine operating parameters has been reached. Unfortunately, known systems that are responsive to engine operating parameters such as this are typically also responsive to either one of the above-described fixed intervals and, therefore, still suffer from the same shortcomings as described above. Thus, it would be desirable to provide an improved method for estimating when a lubricating material should be changed in response to the amount of actual usage of the engine.

SUMMARY OF THE INVENTION

This invention relates to an improved method for estimating when a lubricating material should be changed in response to the amount of actual usage of the engine. Initially, a quantity of use of an engine and a time of use of the engine are measured. A useful life indication of a lubricating fluid in the engine is generated based upon a first relationship between the quantity of use of an engine and the time of use of the engine when an operating characteristic is at or below a predetermined amount, such as the average speed of a vehicle containing the engine. The useful life indication of the lubricating fluid in the engine is generated based upon a second relationship between the quantity of use of an engine and the time of use of the engine when the operating characteristic is above the predetermined amount.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
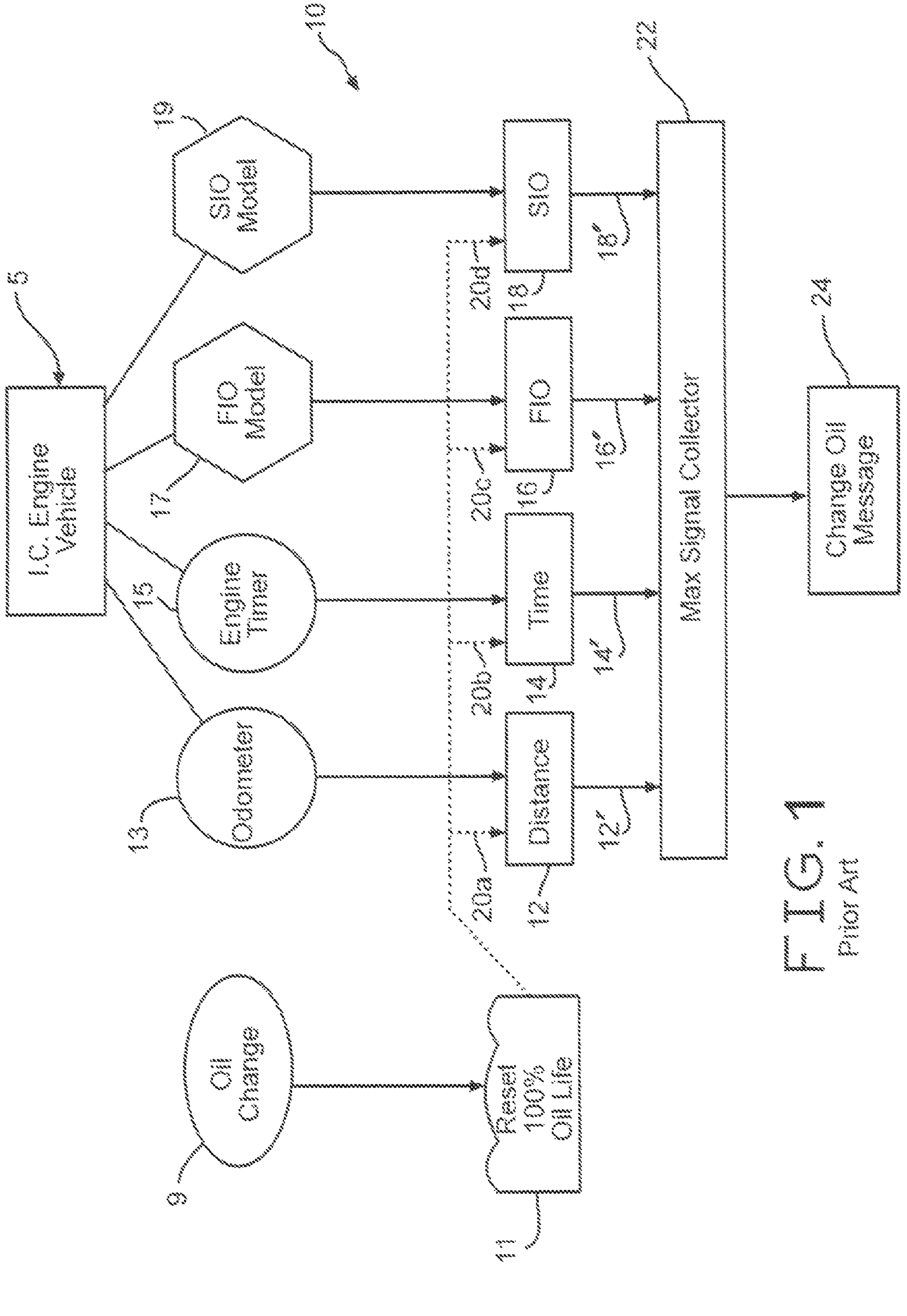
FIG. 1 Prior Art
FIG. 1 is a block diagram of a prior art apparatus for estimating when a lubricating material in an engine should be changed.

Referring now to the drawings, there is illustrated in FIG. 1 a block diagram of a prior art apparatus, indicated generally at 10, for estimating when a lubricating material (such as oil) in an engine 5 (such as an internal combustion engine of an automotive vehicle) should be changed. The prior art apparatus 10 includes four maximum oil life triggers 12, 14, 16, and 18. The first trigger 12 is a vehicle distance traveled trigger, which can be derived from an odometer 13 on the vehicle. The distance traveled trigger 12 may generate a signal on a line 12' when the vehicle has traveled a predetermined distance, such as 7,500 miles, following a previous oil change. The second trigger 14 is an engine operating time trigger, which can be derived from a timer 15 monitoring the engine 5. The operating time trigger 14 may generate a signal on a line 14' when the engine 5 has been operated for a predetermined amount of time, such as 200 hours. The third trigger 16 is a fuel-in-oil trigger, which can be derived from a fuel-in-oil sensor or model 17. The fuel-in-oil trigger 16 may generate a signal on a line 16' when the fuel-in-oil model 17 senses or predicts that the oil contains a predetermined amount of fuel. Lastly, the fourth trigger 18 is a soot-in-oil trigger, which can be derived from a soot-in-oil sensor or model 19. The soot-in-oil trigger 18 may generate a signal on a line 18' when the soot-in-oil model 19 senses or predicts that the oil contains a predetermined amount of soot.

A system reset component 11 is provided that can send signals over respective lines 20*a*, 20*b*, 20*c*, and 20*d* to reset each of the four triggers 12, 14, 16, and 18 after an oil change has been performed. The four triggers 12, 14, 16, and 18 operate in a parallel fashion, independently of one another, such that any one or more of the triggers 12, 14, 16, and 18 can send its signal over the associated lines 12', 14', 16', and 18' to a maximum engine oil life signal collector 22. When the maximum engine oil life signal collector 22 receives a signal over any one or more of the lines 12', 14', 16', and 18' from any one of the triggers 12, 14, 16, and 18, it generates a change oil message 24 to alert an operator of the vehicle that an oil change should be performed.

Figure 2:
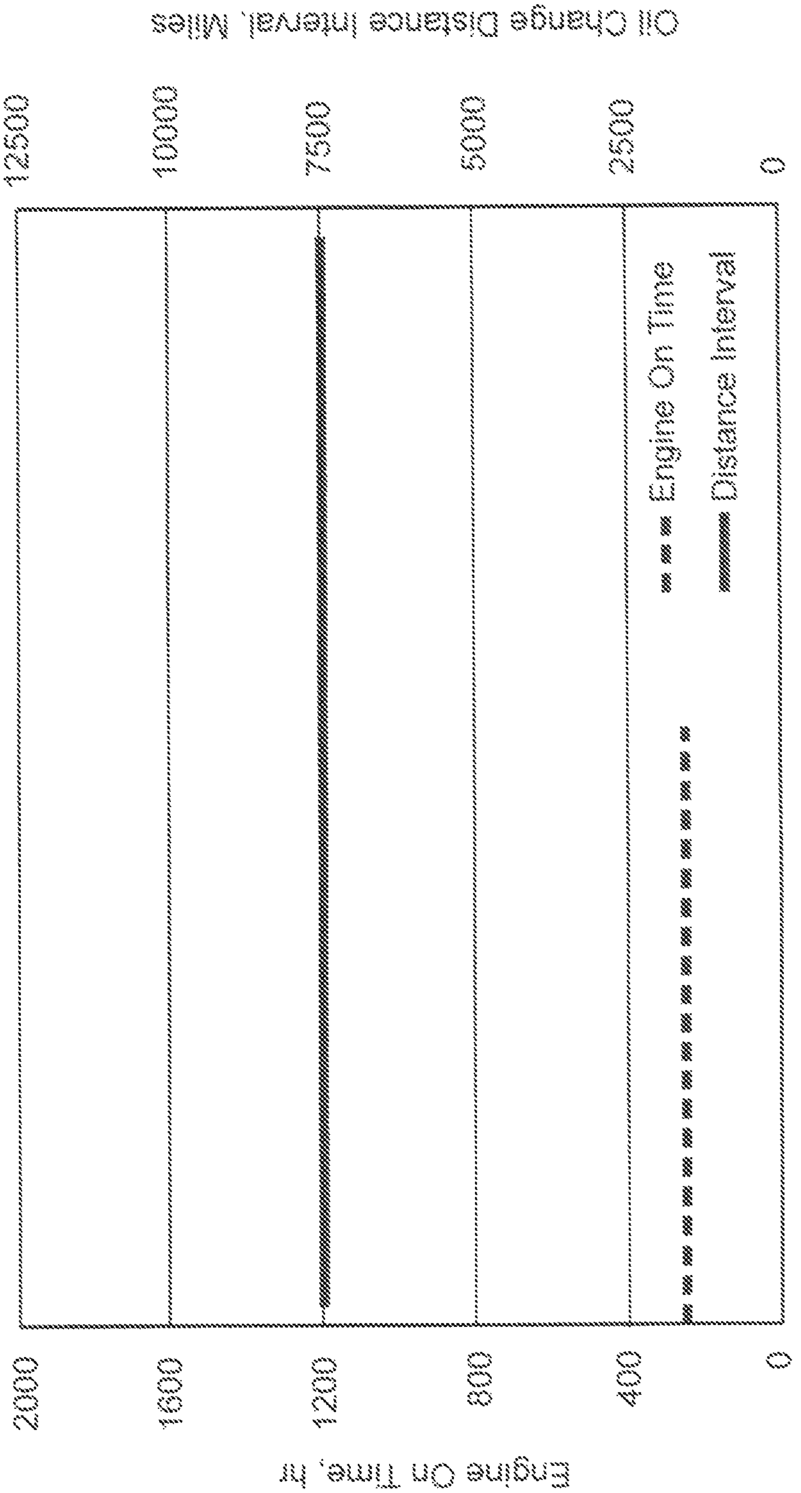
FIG. 2 Prior Art
FIG. 2 is a chart that graphically represents a prior art method of estimating when a lubricating material in an engine should be changed.

FIG. 2 is a graph that illustrates typical prior art trigger points for the distance traveled trigger 12 and the operating time trigger 14. As shown therein, the distance traveled trigger 12 and the operating time trigger 14 function completely independently of one other. Each of the distance traveled trigger 12 and the operating time trigger 14 sends its signal over the lines 12' and 14' to the maximum engine oil life signal collector 22 when its associated predetermined trigger point is reached, regardless of whether the other trigger is close to its trigger point. For example, a signal will be sent by the distance traveled trigger 12 over the line 12' when the vehicle mileage reaches 7,500 miles, even if engine operating time is only 120 hours. Similarly, a signal will be sent by the engine operating time trigger 14 over the line 14' when the engine operating time is only 200 hours, even of the vehicle mileage is only 6,500 hours.

Figure 3:
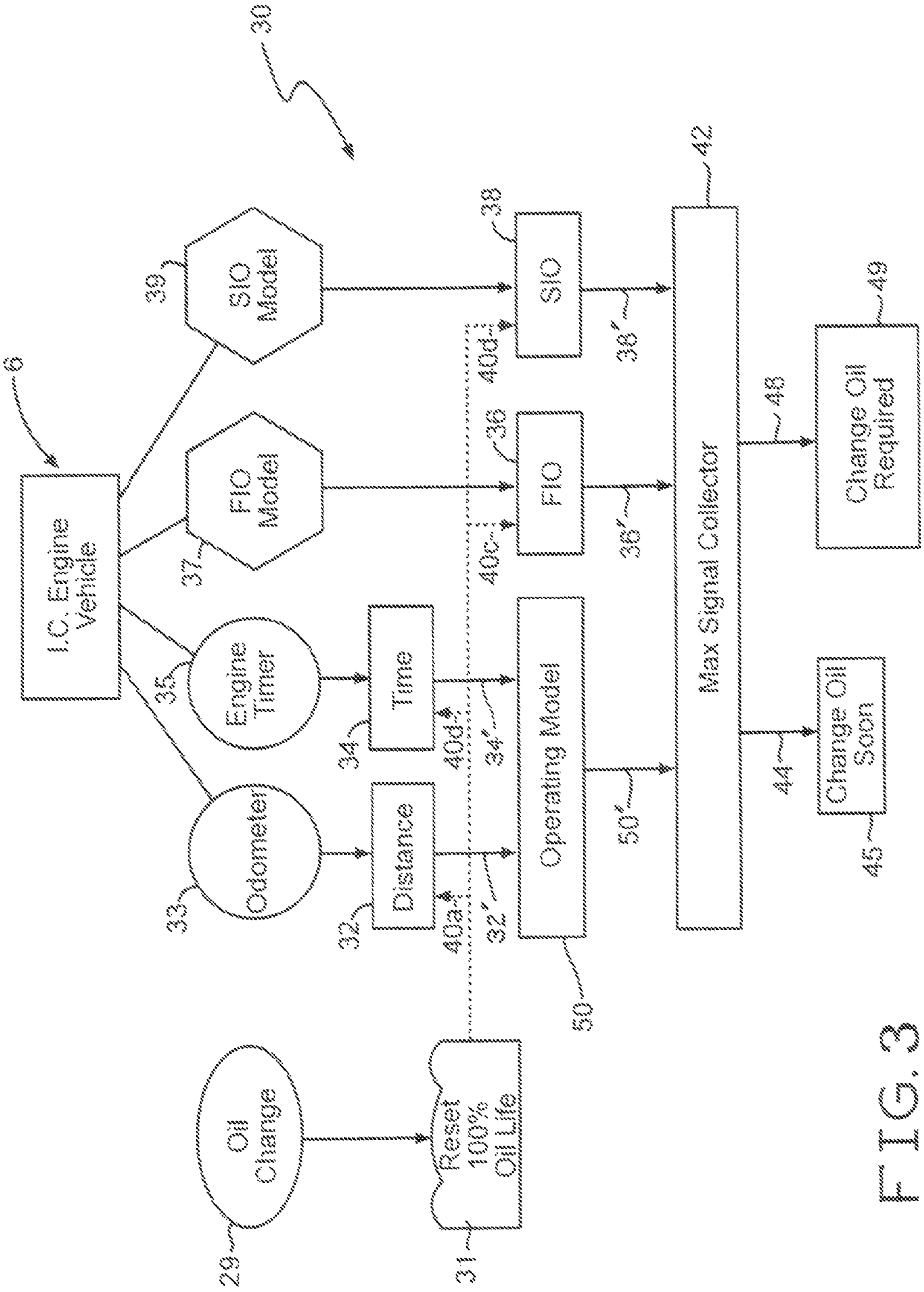
FIG. 3 is block diagram of an apparatus for estimating when a lubricating material in an engine should be changed in accordance with this invention.

Referring now to FIG. 3, there is illustrated a block diagram of an apparatus, indicated generally at 30, in accordance with this invention for estimating when a lubricating material (such as oil) in an engine 6 (such as an internal combustion engine of an automotive vehicle) should be changed. The system 30 includes four maximum oil life triggers 32, 34, 36, and 38. The first trigger 32 is a vehicle distance traveled trigger, which can be derived from an odometer 33 provided on the vehicle. The distance traveled trigger 32 may generate a signal on a line 32' when the vehicle has traveled a predetermined distance, such as 7,500 miles, following a previous oil change. The second trigger 34 is an engine operating time trigger, which can be derived from a timer 35 monitoring the engine 6. The operating time trigger 34 may generate a signal on a line 34' when the engine has been operated a predetermined amount of time, such as 200 hours. The third trigger 36 is a fuel-in-oil trigger, which can be derived from a fuel-in-oil sensor or model 37. The fuel-in-oil trigger 36 may generate a signal on a line 36' when the fuel-in-oil model 37 senses or predicts that the oil contains a predetermined amount of fuel. Lastly, the fourth trigger 38 is a soot-in-oil trigger, which can be derived from a soot-in-oil sensor or model 39. The soot-in-oil trigger 38 may generate a signal on a line 38' when the soot-in-oil model 39 senses or predicts that the oil contains a predetermined amount of soot. A system reset component 31 sends signals over respective lines 40*a*, 40*b*, 40*c*, and 40*d* to reset each of the four triggers 32, 34, 36, and 38 after an oil change 29 has been performed.

The signals generated from the distance traveled trigger 32 and the operating time trigger 34 are fed respectively over the lines 32' and 34' to an operating model 50. In a manner that is described in detail below, the operating model 50 selectively generates a composite trigger signal on a line 50' to a maximum engine oil life signal collector 42. The signals generated from the fuel-in-oil trigger 36 and the soot-in-oil trigger 38 are fed over the respective lines 36' and 38' to the maximum engine oil life signal collector 42. When the maximum engine oil life signal collector 42 receives either the composite trigger signal over the line 50' from the operating model 50 or one of the signals over the lines 36' or 38' from either of the fuel-in-oil or the soot-in-oil triggers 36 and 38, it generates a change oil message 44 to alert an operator of the vehicle that an oil change is due to be performed.

If desired, each of the triggers 36, 38, and 50 may be configured to send two signals over the lines 36', 38', and 50', respectively, to the maximum engine oil life signal collector 42. A first signal can be generated by any of the triggers 36, 38, or 50 when it reaches a value that is equivalent to 95% of a predetermined actual maximum oil life. When one of these first signals is sent, the maximum engine oil life signal collector 42 can send a signal over a line 44 to activate a first vehicle operator message 45 indicating that an oil change will soon be needed. A second signal can be generated by any of the triggers 36, 38, or 50 when it reaches a value that is equivalent to 100% of the predetermined actual maximum oil life. When one of these second signals is sent, the maximum engine oil life signal collector 42 can send a signal over a line 48 to activate a second vehicle operator message 49 indicating that an oil change is currently needed.

The operating model 50 is designed to represent the vehicle usage in a manner that is more closely relevant to the actual condition of the lubricating material used in the engine 6. For example, a vehicle operating mainly in the city, with greater than normal stop-and-go and idling, will experience engine oil deterioration at a different rate than a vehicle operating mainly at highway speeds, and a hybrid vehicle engine will experience engine oil deterioration at an even further different rate. The operating model 50 of this invention simply and efficiently accounts for these differing operating conditions to estimate when such a lubricating material should be changed.

In a preferred embodiment, the operating model 50 calculates an average speed of a vehicle containing the engine 6 when the engine 6 is operated. This average engine speed is used as an operating characteristic that will determine when the operating model 50 will generate its composite trigger signal on the line 50' to the maximum engine oil life signal collector 42. Using this calculated average speed operating characteristic, a selection of two or more relationships (such as are indicated at 52 and 54 in FIG. 4) can be used for determining when the operating model 50 will generate the composite trigger signal on the line 50' to the maximum engine oil life signal collector 42. The selection of the specific relationship 52 and 54 depends on whether the operating characteristic (in this instance, the calculated average speed) is above, equal to, or below a predetermined threshold. The predetermined threshold may be set at any desired magnitude, such as six miles per hour in the illustrated embodiment. However, the predetermined threshold may fall within any desired range, such as from just above zero miles per hour to about twenty miles per hour depending on the type of vehicle, expected driving conditions, etc. Subcompact passenger vehicles, SUVs, trucks, off-road vehicles, hybrid vehicles, and the like may all have differently designed operating model relationships. For most vehicle applications, however, the predetermined threshold will be in the range of about two miles per hour to about twelve miles per hour. As suggested above, any desired operating characteristic other than average vehicle speed can be measured or calculated for this purpose.

Figure 4:
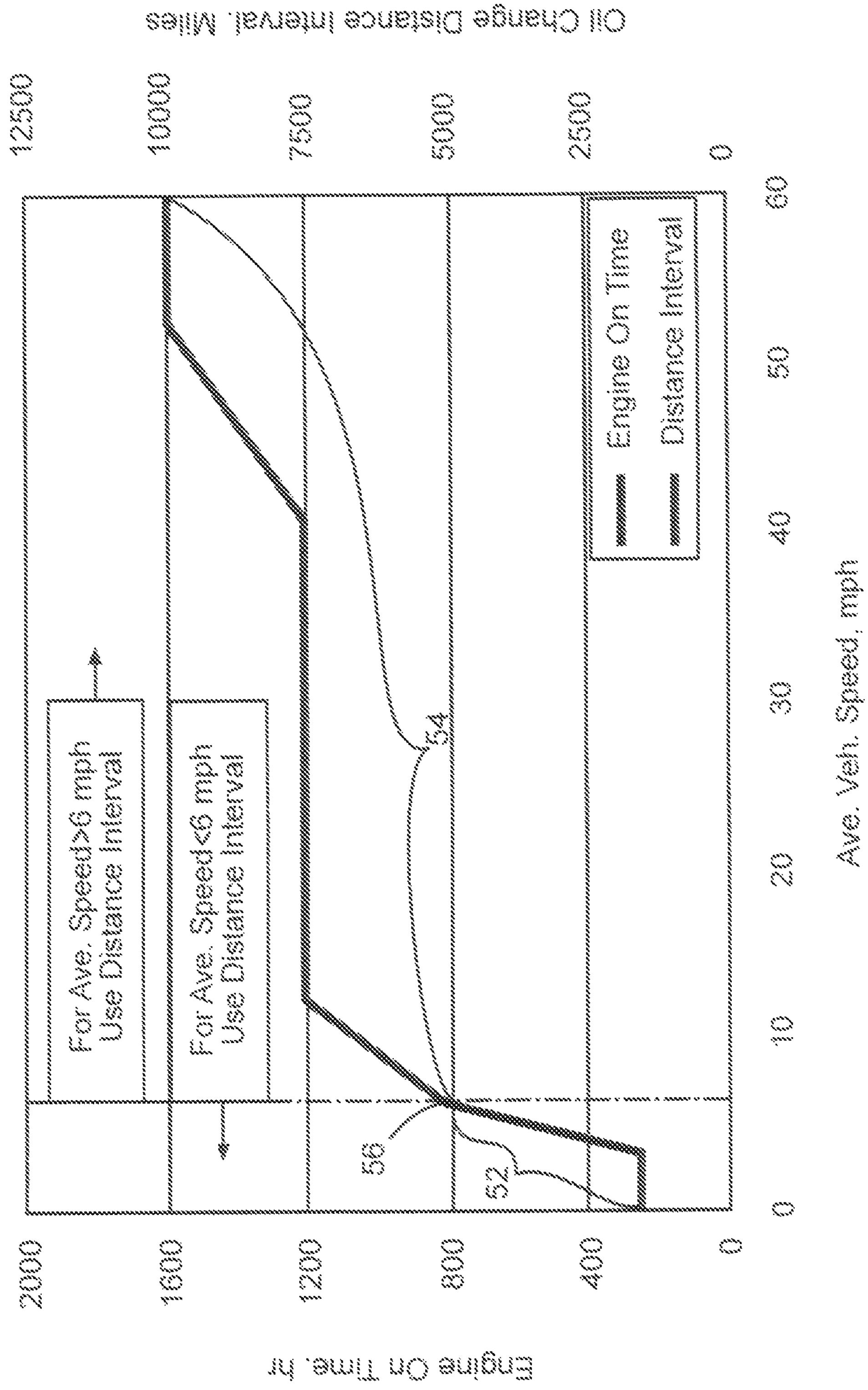
FIG. 4 is a chart that graphically represents a method of estimating when a lubricating material in an engine should be changed in accordance with this invention.

FIG. 4 is a graph that illustrates the operating model 50 shown FIG. 3. As mentioned above, the illustrated graph shows two of such relationships 52 and 54. As will be explained in detail below, the operating model 50 utilizes the first illustrated relationship 52 when the operating characteristic (in the illustrated embodiment, the calculated average speed of the engine 6) is at or below the predetermined threshold. The operating model 50 utilizes the second illustrated relationship 54 when the calculated average speed of the engine 6 is above the predetermined threshold.

The first illustrated relationship 52 is average vehicle speed (which can be expressed in terms of miles per hour on the horizontal axis) vs. engine on time (which can be expressed in terms of hours of running time on the left vertical axis). In this example, when the average vehicle speed is at or below six miles per hour, the first illustrated relationship 52 shows the trigger point of the operating model 50 varying from 200 hours to 800 hours of engine running time, regardless of actual vehicle mileage. The second illustrated relationship 54 is average vehicle speed (which can be expressed in terms of miles per hour on the horizontal axis) vs. oil change distance interval (which can be expressed in terms of miles on the right vertical axis). In this example, when the average vehicle speed is greater than six miles per hour, the second illustrated relationship 54 shows the trigger point of the operating model 50 varying from 5,000 to 10,000 vehicle miles, regardless of engine running time. Although the two illustrated relationships 52 and 54 are different, it is possible that they may produce the same outcome on occasion, such as would occur at point 56 in FIG. 4.

In hybrid vehicles, the time of engine use determined by the timer 35 used in the system 30 is limited to that of the engine 6 itself (which is typically an internal combustion engine). Because of the hybrid nature of the vehicle, the total vehicle mileage (or even mileage accumulated only when the engine is running) may not accurately represent the quantity of use of the engine 6. This is because the engine 6 may be contributing varying amounts of torque or power at any speed, depending on the torque or power contribution of the electrical operation of the hybrid vehicle. Therefore, a representation of the quantity of engine use can be represented by engine torque, which in turn can be represented by fuel usage. Engine speed (measured in revolutions per minute) can also accurately represent the quantity of engine use in hybrid vehicles, as will be apparent to those skilled in the art.

This invention improves upon previously known methods of evaluating internal combustion engine lubrication oil by employing a vehicle operating model instead of just predetermined triggers. This invention uses the relationship between engine running time and engine vehicle distance traveled to create variable trigger points. Alternatively, engine speed or the number of combustion ignitions can be used instead of vehicle distance traveled to indicate the amount of engine use. This invention utilizes multiple relationships for estimating oil condition and recommending oil change intervals.

In summary, it can be seen that this invention can indicate trigger points above and below that of prior known systems depending upon one or more operating conditions of the vehicle. This will provide a more accurate and reliable estimation of oil life for optimized oil change intervals to insure that the engine runs with high quality oil for reliability and engine durability, and at the same time reduces oil waste.

While this invention has been described in reference to the illustrated embodiment, various modifications thereto will occur to those skilled in the art. In this regard, it will be understood that systems incorporating such modifications may fall within the scope of this invention, which is defined by the appended claims.

What is claimed is:

1. An apparatus for generating a useful life indication of a lubricating fluid in an engine in a vehicle, the apparatus comprising:

a first trigger that measures a first engine use parameter;

a second trigger that measures a second engine use parameter;

an operating model that (a) calculates average vehicle speed, and (b) is responsive to at least one of the first and second triggers for generating a useful life indication of a lubricating fluid in the engine, the operating model generating the useful life indication that is (1) based upon the first engine use parameter when the average vehicle speed is within a first value range, and (2) based upon the second engine use parameter when the average vehicle speed is within a second value range different than the first value range.

2. The apparatus defined in claim 1 wherein, when the engine is used for a time and quantity, the generation of the useful life indication generated when the average vehicle speed is within the first value range is based on a ratio of a quantity of use of the engine to a time of engine use.

3. The apparatus defined in claim 2 wherein the quantity of use of the engine and the time of use of the engine are measured only when the engine is operating.

4. The apparatus defined in claim 1 wherein, when the engine is used for a time and quantity, the generation of the useful life indication generated when the average vehicle speed is within the second value range is based on a ratio of a quantity of use of the engine to an oil change distance interval.

5. The apparatus defined in claim 1 wherein, when the engine is used for a time and quantity, the generation of the useful life indication generated when the average vehicle speed is within the first value range is based on a ratio of a quantity of use of the engine to a time of use of the engine and the generation of the useful life indication generated when the average vehicle speed is within the second value range is based on a ratio of a quantity of use of the engine to an oil change distance interval.

6. The apparatus defined in claim 1 wherein the first value range of the average vehicle speed is at or below about six miles per hour and the second value of the average vehicle speed is above about six miles per hour.

7. The apparatus of claim 1 wherein the first engine use parameter is a time of use of the engine.

8. The apparatus of claim 1 wherein the second engine use parameter is a quantity of use of the engine.

9. The apparatus of claim 8 wherein the average vehicle speed is determined over periods of time when the engine is in operation.

10. The apparatus defined in claim 8 wherein the quantity of use of the engine is determined by distance traveled by the vehicle.

11. The apparatus defined in claim 8 wherein the quantity of use of the engine is determined by revolutions of the engine.

12. The apparatus defined in claim 8 wherein the quantity of use of the engine is determined by ignitions of the engine.

13. The apparatus defined in claim 8 wherein the quantity of use of the engine is determined by an amount of fuel used by the engine.

14. The apparatus defined in claim 8 wherein the quantity of use of the engine is determined by an amount of torque exerted by the engine.

15. An apparatus for generating a useful life indication of a lubricating fluid in an engine, the engine having one or more lubricating fluid quality sensors, the apparatus comprising:

a first trigger that measures a first engine use parameter;

a second trigger that measures a second engine use parameter;

an operating model that calculates average vehicle speed, the operating model responsive to the first and second triggers for generating a useful life indication of a lubricating fluid in the engine, the operating model independent of the one or more lubricating fluid quality sensors, the operating model generating the useful life indication that is (1) based upon the first engine use parameter when the average vehicle speed is within a first value range, and (2) based upon the second engine use parameter when the average vehicle speed is within a second value range different than the first value.

16. The apparatus defined in claim 15 wherein, when the engine is used for a time and quantity, the generation of the useful life indication generated when the average vehicle speed is within the first value range is based on a ratio of a quantity of use of the engine to a time of engine use.

17. The apparatus defined in claim 15 wherein, when the engine is used for a time and quantity, the generation of the useful life indication generated when the average vehicle speed is within the second value range is based on a ratio of a quantity of use of the engine to an oil change distance interval.

18. The apparatus of claim 15 wherein the first engine use parameter is a time of use of the engine.

19. The apparatus of claim 15 wherein the second engine use parameter is a quantity of use of the engine.

* * * * *